United States Patent [19]

McKean

[11] 3,956,555

[45] May 11, 1976

[54] LOAD CARRYING MEMBER CONSTRUCTED OF ORIENTED WOOD STRANDS AND PROCESS FOR MAKING SAME

[75] Inventor: Herbert B. McKean, Lewiston, Idaho

[73] Assignee: Potlatch Corporation, San Francisco, Calif.

[22] Filed: Sept. 23, 1974

[21] Appl. No.: 508,205

[52] U.S. Cl. .......... 428/106; 156/296; 156/62.2; 264/108; 264/136; 428/44; 428/113; 428/114; 428/131

[51] Int. Cl.² .......... B32B 5/12

[58] Field of Search .......... 161/56, 57, 58, 59, 161/60, 112, 113, 109, 36, 37; 428/44, 106, 113, 114, 131; 156/296, 62.2, 62.6, 62.8; 264/108, 136, 137

[56] References Cited

UNITED STATES PATENTS

| | | | |
|---|---|---|---|
| 2,139,880 | 12/1938 | Colucci | 161/56 |
| 2,642,371 | 6/1953 | Fahrni | 428/112 |
| 2,847,733 | 8/1958 | Roy | 161/60 |
| 2,960,423 | 11/1960 | Kreibaum | 161/139 |
| 2,990,027 | 6/1961 | Sabine | 161/112 |
| 3,164,511 | 1/1965 | Elmendorf | 428/114 |
| 3,342,665 | 9/1967 | Shannon | 161/36 |
| 3,447,996 | 6/1969 | Himmelheber et al. | 428/112 |
| 3,478,861 | 11/1969 | Elmendorf | 198/33 |
| 3,807,931 | 4/1974 | Wood et al. | 198/33 |

FOREIGN PATENTS OR APPLICATIONS

| | | | |
|---|---|---|---|
| 323,531 | 9/1957 | Switzerland | 428/106 |
| 355,128 | 6/1922 | Germany | 428/106 |
| 342,359 | 12/1959 | Italy | 428/44 |

*Primary Examiner*—William J. Van Balen
*Assistant Examiner*—William R. Dixon, Jr.
*Attorney, Agent, or Firm*—Wells, St. John & Roberts

[57] ABSTRACT

An elongated structural member formed of bonded directionally-oriented wood strands. The member is rectangular in cross section, having a width between longitudinal side edges and thickness between parallel longitudinal faces joining the side edges. Oriented wood strands are utilized to form the member, with flange sections extending inwardly from the side edges and a web section extending between the flanges. Strands within the flange sections are longitudinally oriented parallel to one another and to the face and edges of the member. Strands within the web section are skewed relative to the strands within the flanges. At the interfaces between the flange sections and web sections, strands are disposed with angular components complementary to strands found in both the flanges and web section. The rectangular configuration of the member facilitates its construction by conventional pressing equipment and techniques. In the present process, a rectangular panel is produced with a plurality of elongated strips of longitudinally oriented strands and a plurality of interspersed web sections alternating across the panel width. Openings may be formed through the web sections along the length of each member in the panel during or after production of the members. A conventional press is then utilized to compress and heat the strands to bond the strands together, forming a composite panel of standard width and length dimensions. After hot pressing, the individual structural members within the panel are separated from each other by cutting or sawing the panel along appropriate lines to make a series of like structural members. The individual members are formed by cutting each strip of longitudinally oriented strands midway across its width on the panel, creating an integral flange section along each side of the structural member.

14 Claims, 3 Drawing Figures

FIG 1
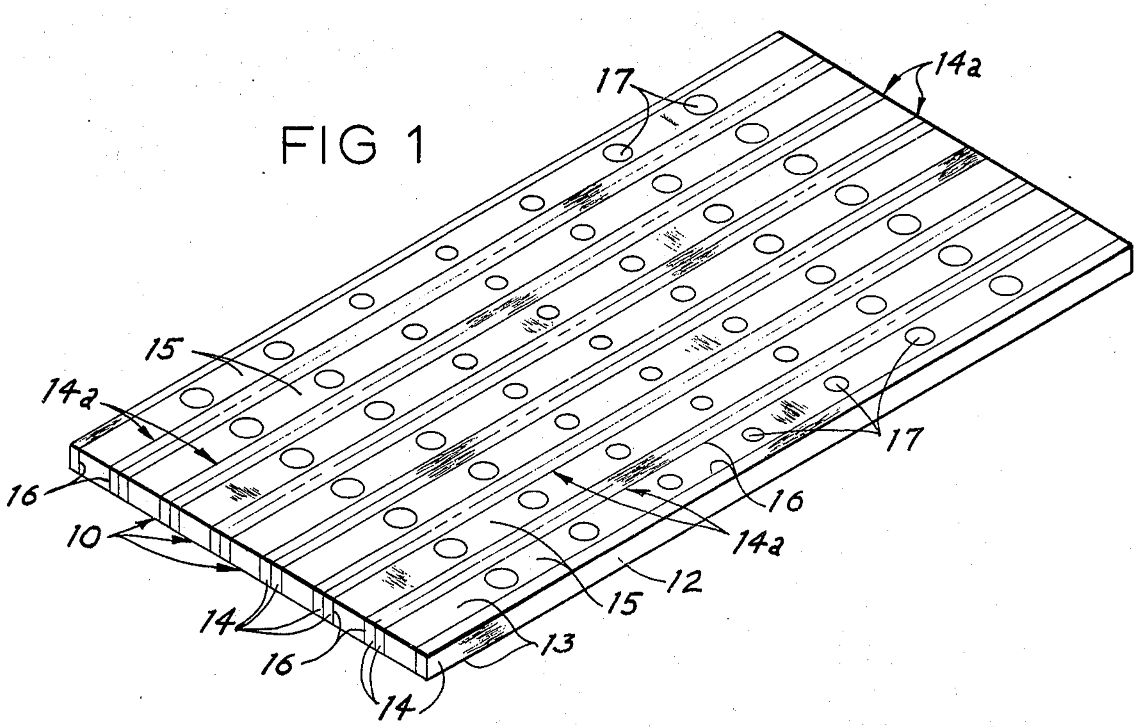
FIG 2
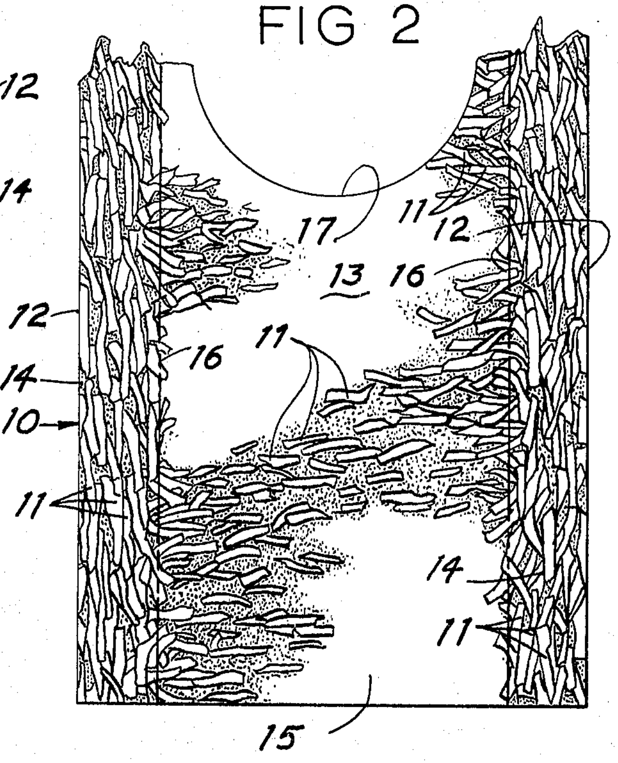
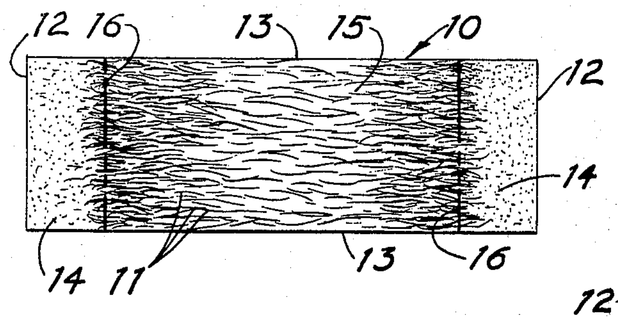
FIG 3

LOAD CARRYING MEMBER CONSTRUCTED OF ORIENTED WOOD STRANDS AND PROCESS FOR MAKING SAME

BACKGROUND OF THE INVENTION

This invention relates to structural, load carrying members and a process for constructing such members. More particularly, it is directed to a structural member formed of bonded, elongated wood strands and a process for constructing same.

In the design of load carrying members it is well understood among engineers that when such members are subjected to bending, for example a simply supported beam carrying a load at its center, a number of stresses are introduced in the beam and the intensity of these stresses varies with the position in the beam. When a simply supported beam is supporting a load the intensity and the direction of stresses within the beam vary from the top to the bottom of the beam. The top of the beam or the concave surface is subjected to compressive stresses which are maximum at the surface of the beam and gradually decrease to zero at the neutral axis of the beam. Tensile stresses develop on the convex side of the beam. As in the case of the compressive stresses the tensile stresses are maximum at the surface of the beam, gradually decreasing to zero at the neutral axis. The intensity of the tensile and compressive stresses will also vary from one end of the beam to the other. A simply supported beam with a load at the center will have maximum tensile and compressive stresses at the center of the length, gradually decreasing to zero at the supports. Other loading conditions and different support situations will influence the distribution of stresses throughout the beam.

Shear stresses also develop in structural members subjected to flexure. In the case of simply supported beams of uniform cross section, the maximum shear stress is reached at the neutral axis over the supports.

Loaded cantilever beams develop stresses as found in simply supported beams with tensile stresses developing on the convex side of the flexed beam and compressive stresses developing on the concave side of the beam. Again shearing stress is created at the neutral axis.

In the case of cantilevered beam maximum compressive and tensile stresses are found at the support with maximum shear at the free end of the member.

Structural members containing apertures will also develop other stresses around or near the openings.

In constructing structural members it is logical to align and position the strongest elements of the member at the point of highest stress. In solid wood beams this is accomplished by aligning the grain structure parallel to the length of the beam thereby providing maximum resistance to the tensile and compressive forces. Natural wooden beams or conventionally laminated wooden beams, however, do provide lowest shear resistance at the neutral axis because of the grain direction in the wood. Under conventional design, on the other hand, wood beams are thick enough and dense enough to provide the needed shear strength. In the case of the oriented wood strand beam, the subject of this invention, the wood strands are oriented parallel to the length of the beams in the flanges where the compressive and tensile stresses will be at their greatest. At the neutral axis which is located in a line along the web, the strands can be oriented in a direction that will give the greatest resistance to shear stresses that might develop in the structural member. Similarly strands can be suitably oriented to withstand stresses that are created around appropriately designed apertures.

Recent developments in the field of wood strand technology have led to the development of reconstituted wood products that have the characteristic of strands therein aligned substantially parallel to one another and to one side of the panel. It has been found possible, with oriented wood strands compressed together and bonded with an appropriate resin, to form a beam or load carrying member that provides bearing characteristics somewhat similar to that of presently known wood load carrying members.

U.S. Pat. No. 3,115,431 to Stokes shows oriented wood particleboard composed of layers, with outer layers running parallel to the length of the panel, and inner layers perpendicular or random in orientation. This disclosure is concerned primarily with the construction of plywood-like panels rather than beams or other specially designed load carrying members. U.S. Pat. No. 2,960,423 to Kreibaum discloses a panel made from randomly oriented particles with veneer surface having oriented grain. The oriented surfaces however are wider than the board thickness.

The product of the present invention is constructed completely of bonded elongated wood strands with integral flanges along the longitudinal side edges thereof. Strands within the flanges are oriented longitudinally along the edges, the strands located within the web being randomly or perpendicularly oriented relative to the flange strands. The density of the mass in the center web may also be less than the density of the material in the flanges. It is intended that the present product be manufactured preferably as an elongated beam of rectangular cross section. The rectangular shape enables formation of a plurality of such beams or members from a single panel formed by conventional particleboard forming machinery. The present process therefore is comprised of steps including placing parallel strips of oriented strands on a supporting surface or "caul" and depositing webs of strands between the parallel strips to form interfaces at junctures of the webs and strips. The webs and strips are deposited within a rectangular area similar in shape to a conventional panel of particleboard. A conventional press may be utilized to form or compress the strips bonding them together to form a conventional sized panel. Once formed, the panel may be cut longitudinally, dividing the strips of longitudinally oriented strands to form individual support members, each comprising a central web section bounded by flanges of longitudinally-oriented structural strands.

SUMMARY OF THE INVENTION

An elongated structural member formed of bonded elongated wood strands is described. It includes a width dimension between longitudinal planar side edges and a thickness dimension between longitudinal planar faces joining the side edges. The member is comprised of spaced longitudinal flange sections extending along the side edges and an integral web section between the flange sections. Interfaces are located at the juncture of the web section and flange sections. The interfaces are spaced inwardly along the width dimension from the side edges. Strands located within the flange sections are oriented with their lengths parallel to one another and to the face and side edges of the member. Strands within the web are skewed relative to the orientation of strands within the flanges. Strands at the interface between webs and flanges are disposed with angular components corresponding to both said flange and web.

A process is also disclosed for forming the structural member as described. The process includes the steps of:

1. Depositing a plurality of elongated parallel strips composed of longitudinally oriented wood strands onto a support surface. The strands are resin coated and are oriented so their lengths are parallel to each other and to the length of the several strips. These strips eventually form the flanges described above.
2. Simultaneously depositing webs of resin coated strands between adjacent pairs of strips on the surface, as the flanges are being formed. The strands which form the webs are skewed relative to the orientation of the strands in the strips to form interfaces at the junctures of the strips and webs. Preferably, the strands within the interfaces are disposed to include angular components corresponding to strands found in both the strips and webs.
3. Compressing the strands against the support surface and applying heat to effect bonding between adjacent strands to form a panel of conventional rectangular size, comprised of alternate rows of strips and webs.
4. Separating the panel into individual structural members by cutting midway across the strips to produce longitudinally oriented flanges on each side of the members. In each member the flanges are located at the longitudinal side edges and the webs are interspersed between the flanges.

As the loose mat is being formed on the support surface, several forming heads in series one after another will be needed to build up sufficient thickness in the mat. Each forming head will deposit strands the full width of the support member. To create lower web density, each forming head will apply more strands for the flange sections and fewer strands for the web sections of the structural member that will ultimately be coming out of the press. Each succeeding forming head will add more strands on top of those previously laid down on the support member until adequate thickness of the mat has been reached to provide proper panel thickness coming out of the press.

It is a first object of the present invention to provide a product and process for producing a load carrying member wherein said load carrying member may be constructed entirely of bonded elongated wood strands.

It is a further object to provide such a product that includes structural properties similar to those of conventional wood structural members.

It is a yet further object to construct such members of wood strands that would often come from unused residues created in logging, lumbering or plywood manufacture.

It is a yet further object to provide such a product that may be utilized with conventional particleboard pressing apparatus without requiring extensive alteration thereof.

An additional object is to provide a process for forming load carrying members wherein a plurality of said members are formed simultaneously within a single press, and wherein the flanges and webs are integrally bound together.

These and other objects and advantages will become apparent upon reading the following disclosure which, taken with the accompanying drawings, describes a preferred form of the present invention.

A BRIEF DESCRIPTION OF THE DRAWINGS

A preferred form of the present invention is illustrated in the accompanying drawing in which:

FIG. 1 is a pictorial view of a panel comprised of a plurality of load carrying members of the present invention;

FIG. 2 is a fragmentary schematic view of a structural member embodying the principles of the present invention; and FIG. 3 is an end view of the member illustrated in FIG. 2.

DETAILED DESCRIPTION OF A PREFERRED EMBODIMENT

The product of the present invention is comprised of a structural load-supporting member and is designated in the drawings by the reference numeral 10. The member 10 is comprised of bonded elongated wood strands 11 that have been coated with an adhesive and pressed as an integral structure.

Each member 10 is rectangular in cross section, having a width dimension between longitudinally elongated side edges 12 and a thickness dimension between parallel faces 13 joining the side edges 12.

Each member 10 also includes parallel spaced flange sections 14 extending longitudinally along the side edges 12. Flanges 14 extend inwardly from side edges 12 along the width dimension to an interface 16. A web 15 is provided between the parallel flange sections 14 locating interfaces or transition regions 16 through the thickness of the beams.

Interfaces or transition regions 16 are designated by dashed lines in the drawings. These lines serve to indicate only approximate interface positions. Since the flanges and webs are integral, making a distinct definition of the interfaces is nearly impossible.

The strands within flanges 14 are oriented predominantly parallel to the side edges 12 and faces 13. Such orientation closely resembles the longitudinal grain of natural wood and lends structural capability to the member somewhat similar to that of conventional wood members.

The webs 15 include strands 11 that will be oriented in a manner to best meet the stress conditions that specific beams will encounter. Thus in some cases the web strands 11 will be oriented substantially perpendicular to the strands within the flanges 14. In other situations the strands 11 in the webs 15 may be layered with strands in one layer at right angles to adjacent layers; in this case the strands in the webs should be at a 45° angle with respect to the strands in the flanges. As another alternate the orientation of the strands in the web may be completely random or otherwise oriented in skewed relationship to the orientation of the strands within flanges 14. The orientation or lack of orientation that might be prescribed for strands in the web of any particular beam would be arranged to provide the greatest resistance against shear stresses at the ends or over supports and to adequately accommodate stresses that would develop around the apertures within the webs. In any event there will be a gradual transition in strand orientation between the flanges and the web. Furthermore, the strands in the web might be of different quality, for example, they might include more fines or be of shorter length than the strands in the flanges which are carrying high compressive and tensile stresses.

The strands located adjacent to and included at interfaces 16 overlap one another and extend across the interfaces from both the flange and web sides. Thus, strands located at the interface are angularly disposed with angular components similar to and corresponding to angular orientations of the strands found both in the flanges and the web sections.

As may be noted in FIGS. 1 and 2, webs 15 include a plurality of openings 17 therein along the length of each member. The size and spaceing of such openings may vary along the member. The arrangement of openings shown in FIG. 1 is such that the longitudinal center of the member includes a somewhat small sized opening and larger openings adjacent the longitudinal ends of the beams. It is often desirable to provide such openings for purposes such as wiring, ventilation, and plumbing.

The rectangular cross-sectional shape of members 10 enables their manufacture by machinery utilized to form oriented strand structural panels. The rectangular shape also enables a plurality of members to be initially formed as a composite panel (FIG. 1).

For a general discussion of oriented strands in structural panels, attention is directed to U.S. Pat. No. 3,164,511 to Elmendorf, which describes strands and a degree of orientation desirable for flanges 14. Examples of strand orientation methods and devices are found in U.S. Pat. No. 3,478,861 to Elmendorf, U.S. Pat. No. 3,115,431 to Stokes et al., and U.S. Pat. No. 3,807,931 to Wood et al. In the interest of brevity, these four prior disclosures are incorporated herein by reference.

The orientation process is necessarily altered somewhat from the procedure for producing structural panels, as the differently oriented flanges and webs must be formed simultaneously. This can be accomplished by passing the strands through a grid of orienting fins arranged parallel to the desired pattern of strand orientation across the panel area. The grid might include fins perpendicular to one another in adjacent areas, fins arranged in an angular pattern, or no fins above certain areas for free random distribution of strands.

In the present process, flanges 14 are produced by depositing a plurality of parallel strips *14a* of strands 11 along a supporting surface caul. As may be noted in FIG. 1, each strip 14a is formed of two integral flange sections 14 except at the longitudinal edges of the panel. Web sections 15 are deposited onto the supporting surface between the strips 14a.

Two features are significant in the mat formation process for depositing strands for both the flanges 14 and the webs 15 simultaneously. The flange orientation will have all strands oriented as closely as possible to the longitudinal direction. Also the flanges 14 will have the highest density of the total member. By manipulating the strand distributors in the forming mechanism of the web, its density can be gradually reduced from that of the flanges towards the center of the member by depositing fewer strands per unit of area. Furthermore, the orientation will change gradually from preponderantly longitudinal in the flanges 14 to either random or perpendicular at the half way point within each web 15 between the upper and lower flanges.

The resulting product however is a panel comprised of loosely accumulated strands having integral strips 14a and web sections 15 across the panel width. Openings 17 may be formed after or during the time web sections 15 are formed. Openings 17 may be formed through webs 15 by appropriate apparatus whereby strands are either prevented from being deposited onto the surface at the areas designated for openings 17; or strands previously deposited are removed from the "felted" layer at specific opening locations prior to pressing. Alternately, opening 17 may be cut or otherwise machined after manufacture of the beams.

The panel, including openings, is then moved to a conventional particleboard press where strands are compressed against the support surface. Heat is simultaneously applied to bond the strands together, forming a rectangular panel of standard dimensions. The final step is to cut strips *14a* longitudinally (as shown in FIG. 1 by dashed lines) to form individual members 10. Each member then includes opposed flanges 14 at longitudinal side edges 12 and a web 14 between the flanges.

An advantage is realized with the openings 17 being formed before the pressing stage of the present process. Openings 17 enable rapid heating throughout the thickness of the members and also provide for escape of steam generated in the pressing stage. Thus, openings 17 enable a higher than usual pressing temperature by allowing escape of steam that would otherwise damage the panel.

Independent control of the manner and rate of application of strands 11 for forming flanges 14 and webs 15 enables one to be of a greater or less density in comparison with the other. This can be accomplished during simultaneous formation of the flanges and webs in the integral panel. This feature of variable density and controlled density would become very advantageous in conservation of strands, in lowered weight of the individual members, and in locating the majority of strands for greatest structural advantage.

To vary density, one would independently control the rate of strand application to the web areas and flange areas of the panel as it is laid up. A loose mat in the web area will subsequently be compressed to the same final thickness as a more dense mat in the flange area — thus creating a final member of varying density.

The dimensions of the final members can be varied to meet conditions of use. Reference here is specifically to thickness and width. However, length can also be altered to meet needs. Thickness would be limited by pressing technology but the lower density web portions including the apertures probably will make possible the pressing of thicker panels than would be practical with solid uniform density panels. Length of members would be limited by the press length.

It is conceivable with the present product, and methods for constructing such product, to provide additional strength to the beams by embedding fibers of filaments among the strands. Such fibers might extend continuously from one end of the beam to another. Such reinforcing fibers or filaments may be comprised of reinforcing glass fibers, or other materials of high strength. Such reinforcing is commonly utilized in the construction art, particularly in reinforced concrete and prestressed concrete members.

It may have become obvious from the above description and attached drawings that various changes and modifications may be made to the present product and process without departing from the intended scope of this disclosure. Only the following claims are therefore intended to define this invention.

What I claim is:

1. An elongated structural beam member having a width dimension between longitudinal planar side edges and a thickness dimension between longitudinal planar faces joining the side edges, comprising:

overlapping elongated wood strands bonded together by a bonding resin forming a single integral elongated structural member;

said integral elongated structural member having spaced longitudinal tension-compression flange sections extending along said side edges between the planar faces in which the overlapping elongated wood strands within said flange sections are oriented parallel to each other and extend in the longitudinal direction of the member;

an integral web section between the flange section and the planar faces in which the overlapping elongated wood strands within the web section are oriented skewed relative to the wood strands within the flange sections; and integral transition regions between the web section and the flange sections in which (1) a portion of the elongated wood strands within the regions overlap between the web section and the flange sections, (2) a portion of the elongated wood strands within the regions are parallel with the strands within the web section, and (3) a portion of the elongated wood strands within the regions are parallel with the strands within the flange sections.

2. The invention of claim 1 wherein the member is rectangular in cross section with the planar faces being parallel to one another and the planar side edges being parallel to one another and perpendicular to and joining the faces.

3. The invention set out by claim 2 wherein the strands within the web section are oriented with their lengths substantially parallel to one another and to the parallel planar faces and substantially perpendicular to the strands within the flanges.

4. The invention set out by claim 2 wherein a plurality of openings are formed through said web sections from one face to the other and are longitudinally spaced apart along the length of said member.

5. The invention set out by claim 1 wherein the member further comprises reinforcing filaments embedded longitudinally among the strands within at least one of the flanges.

6. A process for producing an integral structural member from elongated wood strands, coated with resin, said member having a thickness dimension between parallel longitudinal planar faces and a width dimension between parallel longitudinal side edges joining the faces, comprising the steps of:

depositing said strands in an overlapping manner onto a supporting surface, simultaneously forming the (1) flange sections along the side edges between the planar faces in which the strands are oriented parallel to each other and extend in the longitudinal direction of the member, (2) an integral web section intermediate the flange sections in which the strands forming the web section being in skewed orientation relative to the strands forming said flange sections, and (3) integral transition regions between the web sections and the flange sections in which (1) a portion of the elongated wood strands within the region overlap between the web section and the flange sections, (2) a portion of the elongated wood strands with the regions are parallel with the strands within the web section, and (3) a portion of strands within the regions are parallel with the strands within the flange section; and applying heat and pressure to the formed strands to cure the resin and form the integral structural member.

7. The process set out by claim 6 further including the step of orienting the strands within said web so they are oriented substantially parallel to one another along their lengths and to the planar faces and substantially perpendicular to the strands within said flanges.

8. The process set out by claim 6 further including the step of forming longitudinally spaced openings through said web between the planar faces.

9. The process set out by claim 6 further including the step of forming longitudinally spaced openings through the web between the planar faces prior to the application of heat and pressure.

10. A process for producing a structural member of bonded elongated wood strands from loosely disoriented elongated wood strands coated with an adhesive, said members having a width dimension between parallel elongated side edges and thickness dimensions between parallel elongated faces joining the side edges, comprising the steps of:

depositing a plurality of elongated parallel flange sections of said strands onto a support surface with said strands being oriented with their lengths parallel to each other and to said strips;

simultaneously depositing webs of strands between adjacent flange sections on the support surface, the strands within said webs being skewed relative to the orientation of said strands within said flange sections, forming interfaces at the junctures of the flange sections and webs where the strands include angular components similar to strands found in both said flange sections and said webs;

applying heat and pressure to the strands against the support surface to cure the adhesive and affect bonding between adjacent strands to form a panel of conventional rectangular size comprising alternate flange sections and webs; and separating the panel into individual structural members by cutting each flange section longitudinally so each member includes a flange comprised of a longitudinal portion of a flange section located at each longitudinal side edge thereof and joined integrally by a web.

11. The process set out by claim 10 further including the step of orienting the strands within said webs so they are positioned parallel to each other and to the planar faces and substantially perpendicular to the strands within the flange sections.

12. The process set out by claim 10 further including the step of forming longitudinally spaced apertures through the webs from one face to the other as the strands are deposited on the support surface.

13. The process set out by claim 10 further including the step of forming longitudinally spaced openings through the webs from one face to the other subsequent to the step of separating the individual structural members.

14. The process set out by claim 10 further including the step of forming longitudinally spaced openings through the webs from one face to the other subsequent to the step of depositing the strands, but prior to the step of applying heat and pressure.

* * * * *